(12) United States Patent
Ruge et al.

(10) Patent No.: US 9,162,823 B2
(45) Date of Patent: Oct. 20, 2015

(54) CONVEYING SYSTEM, CONVEYING ELEMENT, AND GUIDE TRACK

(75) Inventors: Martin Ruge, Starrkirch-Wil (CH); Markus Felix, Richterswil ZH (CH)

(73) Assignee: Ferag AG, Hinwil (CH)

( * ) Notice: Subject to any disclaimer, the term of this patent is extended or adjusted under 35 U.S.C. 154(b) by 52 days.

(21) Appl. No.: 13/988,855

(22) PCT Filed: Nov. 23, 2011

(86) PCT No.: PCT/CH2011/000281
§ 371 (c)(1),
(2), (4) Date: May 22, 2013

(87) PCT Pub. No.: WO2012/068694
PCT Pub. Date: May 31, 2012

(65) Prior Publication Data
US 2013/0248326 A1      Sep. 26, 2013

(30) Foreign Application Priority Data

Nov. 26, 2010   (CH) ........................................ 1989/10

(51) Int. Cl.
*B65G 39/20* (2006.01)
*B65G 19/02* (2006.01)
*B65G 21/22* (2006.01)

(52) U.S. Cl.
CPC ............... *B65G 19/02* (2013.01); *B65G 21/22* (2013.01); *B65G 39/20* (2013.01)

(58) Field of Classification Search
CPC ........ B65G 19/02; B65G 21/22; B65G 39/20; B65G 39/025

USPC ....................................................... 193/35 MD
See application file for complete search history.

(56) References Cited

U.S. PATENT DOCUMENTS

| | | | | |
|---|---|---|---|---|
| 1,144,365 A | * | 6/1915 | Lembke | 16/26 |
| 1,327,920 A | * | 1/1920 | Kozik | 16/26 |
| 2,830,824 A | | 4/1958 | Young | |
| 2,952,145 A | | 9/1960 | Thompson | |
| 4,899,871 A | * | 2/1990 | Olsson | 198/778 |
| 4,903,823 A | | 2/1990 | Plesser | |
| 5,074,678 A | * | 12/1991 | Eberle | 384/49 |

(Continued)

FOREIGN PATENT DOCUMENTS

| | | |
|---|---|---|
| CH | 663773 | 1/1988 |
| CN | 201169456 | 12/2008 |

(Continued)

*Primary Examiner* — Gene Crawford
*Assistant Examiner* — Thomas Randazzo
(74) *Attorney, Agent, or Firm* — Rankin, Hill & Clark LLP (57) ABSTRACT

A conveying system includes rolling bodies each with a rolling element cage and rolling elements. The rolling elements are arranged in recesses of the rolling element cage and for the rolling in a guide channel. In each case two or three or more rolling elements form a roller set, and the rolling elements of a roller set roll on one another as well as on the guide channel, and at least one roller set is present per rolling body. The conveying system includes at least two guide channels which run at an essentially constant distance to one another and together form a guide path; and at least two rolling bodies are connected to one other by way of a connection element, into a conveying element, and the conveying element with its at least two rolling bodies is movable in at least two guide channels along the guide path.

16 Claims, 12 Drawing Sheets

(56) References Cited

U.S. PATENT DOCUMENTS

| | | | |
|---|---|---|---|
| 5,529,168 A * | 6/1996 | Soriano et al. | 198/465.1 |
| 6,079,553 A * | 6/2000 | Takahashi et al. | 198/852 |
| 6,113,273 A * | 9/2000 | Eberle et al. | 384/40 |
| 6,450,319 B1 * | 9/2002 | Reist | 198/358 |
| 6,499,588 B1 * | 12/2002 | Eberle | 198/861.2 |
| 2001/0030105 A1 | 10/2001 | Maeder | |
| 2005/0194232 A1* | 9/2005 | Taylor | 193/35 MD |
| 2006/0151300 A1 | 7/2006 | Blasi | |

FOREIGN PATENT DOCUMENTS

| | | | | |
|---|---|---|---|---|
| DE | 1194319 | 6/1965 | | |
| DE | 2615598 | 10/1976 | | |
| DE | 2854778 | 6/1979 | | |
| DE | 4323127 | 8/1994 | | |
| DE | 10207687 | 9/2003 | | |
| EP | 0891933 | 1/1999 | | |
| EP | 1070012 | 1/2001 | | |
| GB | 722750 | * 1/1955 | | B65G 39/20 |
| GB | 1537876 | 4/1976 | | |
| GB | 1 463 226 | 2/1977 | | |
| NL | 119481 | * 1/1948 | | B65G 39/20 |
| WO | 90/02269 | 3/1990 | | |
| WO | 99/33720 | 7/1999 | | |
| WO | 2005/087627 | 9/2005 | | |

* cited by examiner

CONVEYING SYSTEM, CONVEYING ELEMENT, AND GUIDE TRACK

BACKGROUND OF THE INVENTION

1. Field of the Invention

The invention relates to the field of conveying technology, and in particular to a conveying system, a conveying element and a guide path.

2. Description of Related Art

Conveying systems comprise conveying elements which are conveyed along a conveying path in a manner linked to one another or individually. The conveying elements comprise means for conveying objects as piece goods (and apart from goods, also persons or animals), or as bulk goods. These means can be grippers or other elements, which are designed for holding an object, or can be elements which extend in a planar, two-dimensional manner, on which or in which the objects lay. Such elements extending in a planar, two-dimensional manner are for example conveyor belts, or comprise linked, typically rigid conveying elements which are displaceable with respect to one another, in order to be able to travel through curves. The conveying elements form an essentially flat surface, on which the conveyed product is conveyed. These linked conveying elements for example are known as mat chains, link chains, slat chains, plate chains (flexbelts, chain belts, carrier chains). They are hereinafter collectively called "modular belts".

Conveying means are mounted differently depending on their type: grippers are mounted for example by way of ball-mounted rollers. Modular belts are for example supported in a planar, two-dimensional manner and thereby slide on slide rails or slide surfaces. Depending on the loading due to the conveyed product, this leads to high friction forces as well as wear, and necessitates corresponding drive forces for moving the modular belt, causing high tensile forces on the modular belt. Other embodiments of modular belts comprise co-running rollers that are part of the modular belt itself, which roll on a surface.

EP 1 070 012 B1 shows chain elements for a modular conveyor belt, without a rolling mounting.

WO 90/02269 shows a rolling element cage with sets of in each case three or also only two bearing balls which roll on one another, wherein each of the bearing balls in turn rolls in a groove on the inner side of a guide rail which partly encompasses the rolling element cage. The rolling element cage is mounted in a linearly displaceable and rotationally fixed manner in the guide rail by way of the mounting in the grooves.

EP 1 009 693 B1 discloses cage-like guide rails with conveying elements rolling therein. In one embodiment, three bearing balls rolling on one another are likewise present, wherein each of the bearing balls in turn rolls on two rods of the guide rail, so that the conveying elements run in a rotationally fixed manner.

U.S. Pat. No. 2,830,824 describes a roller vehicle which can be displaced on a plane surface in all directions and for this is mounted in a rolling manner on several balls, wherein each of these balls in turn rolls on several bearing balls.

CH 663 773 A5 describes a ball joint link-chain which is mounted in a guide rail between two rows of balls which lie opposite one another.

U.S. Pat. No. 2,952,145 discloses a linear ball bearing, in which a hollow body is arranged around a shank and mounted in a manner, in which it is displaceable along the shank and rotationally fixed. Balls are in each case arranged in a paired manner in correspondingly arranged grooves, between the hollow body and the shank, so that the balls on the one hand roll on the hollow body and the shank, and on the other hand on one another.

A spatially movable conveyor is disclosed in DE 37 90 593, with a tension chain of elongate links, in which a bearing ball is arranged, which rolls between four guide rails.

BRIEF SUMMARY OF THE INVENTION

It is the object of the invention, to provide a conveying system, a conveying element and a guide path of the initially mentioned type, which permit a smooth, low-friction movement. A further object is to provide a simple design which is easy to clean and which can be used without any lubricant.

These objects are achieved by a conveying system, a conveying element and a guide path, with the features of the respective independent patent claims.

The conveying system thus comprises rolling bodies each with a rolling element cage and rolling elements, wherein the rolling elements are arranged in recesses of the rolling element cage and for rolling in a guide channel, wherein in each case two or three or more rolling elements form a roller set, and the rolling elements of a roller set roll on one another as well as on the guide channel, and at least one roller set is present per rolling body. Therein, the conveying system comprises at least two guide channels which run at an essentially constant distance to one another and together form a guide path, and at least two rolling bodies are connected to one another into a conveying element by way of a connection element. Therein, the conveying element with its at least two rolling bodies is movable in at least two guide channels along the guide path.

The mentioned connection of elements can be a positive fit connection, a non-positive fit (or force fit) connection or a material fit connection or be realised by a snap connection, a bayonet connection, locking-in, hooking, screwing, bonding, welding, riveting etc.

Thus the conveying system comprises a first and a second guide channel, and a first of the two rolling bodies rolls in the first guide channel and a second of the rolling bodies in the second guide channel. The middle points of the rolling elements of a roller set lie in a plane which runs perpendicularly to the movement direction of the rolling element cage in the guide channel. The rolling elements remain stationary with regard to the rolling element cage.

In contrast to a roller bearing of the known type, where for example ball cages are known, but are only used for spacing of rolling elements, the device is designed for load forces to be introduced via the rolling element cages.

In a preferred embodiment of the invention, each of the rolling elements contacts the guide channel in each case at only one point. This means that each of the rolling elements rolls along a single line on the guide channel. This is in contrast to the state of the art according to the initially mentioned WO 90/02269 and EP 1 009 693 B1. Thus a rotation of the rolling body about an axis parallel to the conveying direction can be made possible.

The rolling elements are preferably supported on one another. Thereby, the rolling element middle points lie on a circle in a plane perpendicular to the conveying direction. In each case, adjacent rolling elements roll on one another, and the rolling elements in the circle mutually support one another to the inside, and are held to the outside by the guide channel, on which they roll.

In a preferred embodiment of the invention, an inner wall of the guide channels, on which the rolling bodies roll, follows a section of a circle. In other words, thus a cross section through a running surface of the guide channels forms a section of a circle. A slot through which a connection between the rolling body and the connection element runs is thereby present next to the regions, in which the inner wall follows a circular course.

By way of this, i.e. on account of the circular course, the individual rolling bodies are not led in the respective guide channel in a rotationally fixed manner. The stabilisation of the conveying element against rotation about the conveying direction in contrast is effected by the presence of the at least two rolling bodies per conveying element, and their connection by the connection element. Due to the fact that the rolling bodies, seen on their own and with respect to the guide channels, can be rotated about an axis parallel to the conveying direction, their movement can follow a curved course without a particularly precise alignment of a rotation of the guide channels (about this axis) being necessary.

In a preferred embodiment of the invention, the guide channels are profile rods, manufactured for example by way of bending or as continuous casting profiles, for example of a steel material, aluminium material or of plastic.

In a preferred embodiment of the invention, a guide which is lateral with respect to a conveying surface moved by the conveying elements is formed on the guide channels as one piece as part of the profile. The guide in the assembled condition of the guide channel is directed essentially upwards and forms a lateral limitation for the movement of conveyed goods, thus of objects which are conveyed on the conveying surface. The conveying surface is formed by a connection element which for example is a plate or a chain element of a modular belt which are conveyed along the guide path by way of the conveying elements. With this, the conveying path or its delimitations downwards and to the sides is completely defined alone by the guide channels and the applied conveying elements.

As the case may be, beams, struts, columns etc. for positioning the path in space are necessary for the construction of the conveying system, but these do not define the delimitation of the conveying path, but only its course through space as a whole.

In a preferred embodiment of the invention, a fastening profile for fastening the guide channels is formed on the guide channels as one piece as part of the profile. The design of the path is further simplified by way of this. Guide channels do not need to be tailored further (for example by way of fastening holes), but can be fastened on beams e.g. by way of screws and slot nuts which can be applied on the fastening profile in a displaceable manner.

In a preferred embodiment of the invention, the profile is manufactured of plastic and in regions, on which the rolling elements roll, comprises roller inlays of metal, for example profiled belts such as strips or wires. If thus each of the two or more rolling elements roll along a single line on the guide channel, then the roller inlays are arranged along the corresponding two or more lines.

In a preferred embodiment of the invention, the slots of the guide channels, through which the rolling bodies are connected to the connection element, are open downwards, when in the condition of the conveying system in which it is ready for operation (thus after assembly at the location of operation). With this, it is possible to clean the conveying system by way of spraying, which is particularly advantageous for applications in the field of the production and processing of medical products or foodstuffs.

In a preferred embodiment of the invention, the conveying elements comprise a plane conveying surface, on which the conveyed product can be conveyed, or the conveying elements comprise holding means for conveying the conveyed products in a hanging manner. The principle of the conveying system is thus basically adaptable to a multitude of applications, wherein the common conceptual element of preventing a rotation about the transport direction by way of the presence of two rolling bodies which are distanced to one another in a direction perpendicular to the transport direction and are displaceable in separate guide channels, is retained.

The separate guide channels can be connected to one another, and specifically with a positive fit, non-positive fit (force fit) or material fit, with single-part or multi-part elements as transverse beams.

In a preferred embodiment of the invention, a conveying element in the connection element comprises at least one compensation element for the compensation of variations in the distance between the guide channels. With this, the demands with regard to the accuracy of the guiding are reduced.

Also, the distance between the guide channels can be designed such that the conveying elements or the compensation element are continuously pretensioned when displaced along the guide path. This is particularly useful if only two rolling elements per roller set are present.

In a preferred embodiment of the invention, the conveying elements comprise at least one drive force introduction for driving the conveying elements. The driving includes the accelerating as well as the braking of the conveying elements, thus the transmission of energy into the movement of the conveying elements as well as the removal (recuperation) of energy from this movement.

In a preferred embodiment of the invention, the conveying system has a drive which acts on the drive force introduction from two directions which are opposite to one another, so that forces of the drive onto the conveying elements which act perpendicularly to the movement direction, compensate one another, and forces of the drive which act parallel to the movement direction, add up. This means the sum of the forces which acts perpendicularly to the movement direction is at least approximately zero.

This is effected for example by way of toothed wheels, toothed belts, drive belts without toothing, chains, roller chains etc., which are arranged opposite one another in pairs with respect to the drive force introduction. Alternatively, the force introduction can engage onto the drive force introduction from only one side. Thereby, an occurring force which is counter to the force which the drive force introduction (not in the conveying direction) exerts onto the conveying elements can be accommodated by the guide channels and/or gravity. In other preferred embodiments of the invention, the introduction of the drive force is effected in a deflection region of the guide path, on the inner or on the outer periphery of the guide path.

In a preferred embodiment of the invention, a conveying element comprises a coupling for the releasable connection to a transport element and/or for a snap connection to a transport element. With this, it is possible on the one hand to create standardised conveying elements as mass products, and on the other hand to manufacture these with special transport elements according to a certain application.

In a preferred embodiment of the invention, all or individual groups of conveying elements are linked to one another and movable, in the conveying direction, or the conveying elements are displaceable individually in the guide path in the conveying direction ("spontaneous conveying system").

A conveying element for use in the conveying system comprises rolling bodies each with a rolling element cage and rolling elements, wherein the rolling elements are rotatably mounted in recesses of the rolling element cage and are designed for rolling in a guide channel, wherein in each case two or three or more rolling elements form a roller set, and the rolling elements of a roller set roll on one another and at least one roller set is present. Thereby, at least two rolling bodies are connected to one another into a conveying element by way of a connection element, and the conveying element with its at least two rolling bodies can be moved in at least two guide channels along the guide path.

A guide channel for use in the conveying system is designed for receiving rolling bodies which roll in the guide channel. Thereby an inner wall of the guide channel, which is designed for the roller bodies rolling on it, follows a section of a circle; the guide channel comprises a wall which leads away from the outer wall of the guide channel and leads along the guide channel and acts as a guide when the guide channel is used in the conveying system.

The longitudinal axis is thereby the axis which extends in the longitudinal direction of the guide channel, thus the direction, along which the profile of the guide channel is drawn.

Further preferred embodiments are to be deduced from the dependent patent claims.

BRIEF DESCRIPTION OF THE DRAWINGS

The subject matter of the invention is hereinafter explained in more detail by way of preferred embodiment examples which are represented in the attached drawings. In each case are shown schematically.

The reference numerals used in the drawings and their significance are summarised in the list of reference numerals. Basically, the same parts are designated with the same reference numerals in the figures.

DETAILED DESCRIPTION OF THE INVENTION

Figure 1:
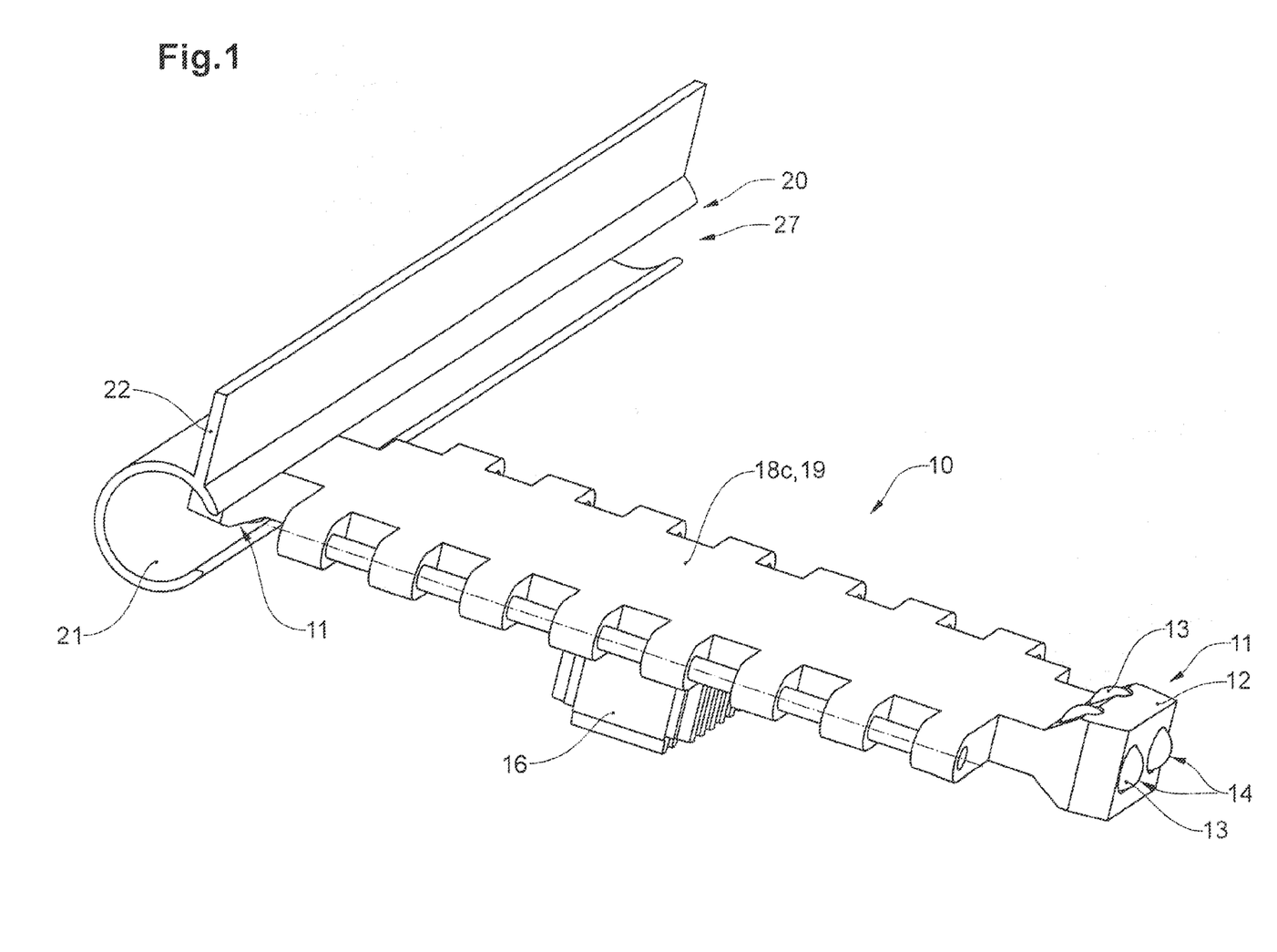
FIGS. 1-9 are perspective views of elements of a conveying system, in different embodiments.

FIG. 1 shows a part of a conveying system with a conveying element 10 and with a guide path 20, wherein a second guide path is not drawn. The conveying element 10 comprises two rolling bodies 11, wherein each rolling body 11 in turn comprises a rolling element cage 12 with rolling elements 13 which are mounted therein. The rolling elements 13 here and in the following examples are balls, but can also basically have another shape, for example the shape of rotation ellipsoids or a barrel-shape. The rolling elements 13 are grouped in groups of two or three rolling elements 13 rolling on one another, into roller sets 14, and in FIG. 1 in each case into two roller sets 14 per rolling body 11, wherein each roller set 14 comprises three rolling elements 13. (The rolling of the rolling elements 13 is explained further below in combination with FIGS. 10 and 11).

The two rolling bodies 11 of a conveying element 10 are arranged in each case in the conveying system for the movement in and along a guide path 20. The rolling bodies 11 are connected to one another by way of a connection element 19. The connection element 19 defines an essentially constant distance between the rolling bodies 11, corresponding to a distance between the guide paths 20. Several elements of the conveying element 10, in particular the rolling element cages 12 and the connection element 19 (and any occurring further elements) can be designed as being made in one single piece from a hard plastic.

The connection element 19 in this embodiment is designed as a chain element 18c of a modular belt. Several such chain elements 18c can be connected to one another into a modular belt in the known manner. An optional drive force introduction 16 is arranged below the connection element 19 and for example permits the introduction of drive forces from below or form the side, for which a toothing is present on the drive force introduction 16.

With regard to the toothing, it is the case here and also for the following examples that the toothing is drawn directed downwards as well as to both sides of the conveying direction. However, also only one toothing can be present in one or two of these directions (only to downwards/only to the side/only to one side, etc.), or there may even be no drive introduction at all. This force introduction (not shown) can be effected for example by way of toothed or flat belts or toothed wheels or chains.

The guide path 20 comprises a guide channel 21 for receiving the rolling body 11, wherein a connection between the rolling body 11 and the connection element 19 leads through a longitudinal slot, hereinafter called simply slot 27. Optionally, a guide path 20 has a lateral guide 22 which forms a guide or a support for objects which are conveyed on or with the conveying elements 10. The lateral guide 22 is integrally formed as one piece on the guide channel 21, for example by way of the guide path 20 being manufactured by an extrusion process.

The described elements in the embodiments of the following figures are shown unchanged or in a modified form. Thereby, it is only the changed elements which are described, and in each case the above description and that at different locations applies to the unchanged elements. It is to be understood that in the embodiments, with which only one conveying element is drawn, a sequence of conveying elements may also be present, wherein these can be moved in a manner connected or linked to one another or also with no connection to one another and with a gap between each other.

Figure 2:
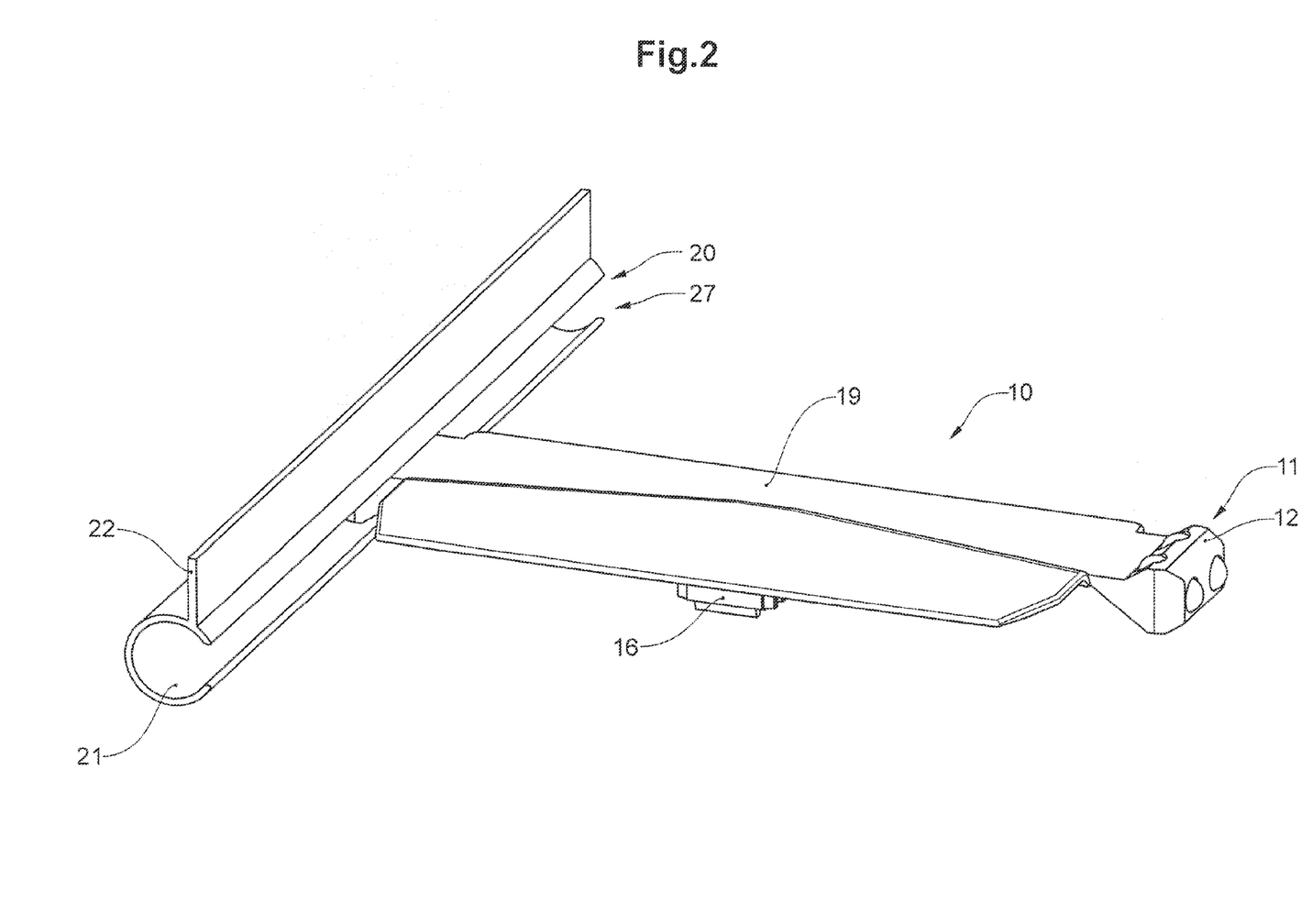

FIG. 2 shows a conveying element 10, with which the connection element 19 comprises an attached or integrally formed plate 18b. This serves for carrying conveyed objects and can be pushed via the connection element 19 of a further (not drawn), preferably equally formed conveying element which is conveyed in the conveying system 1 subsequently to this.

Figure 3:
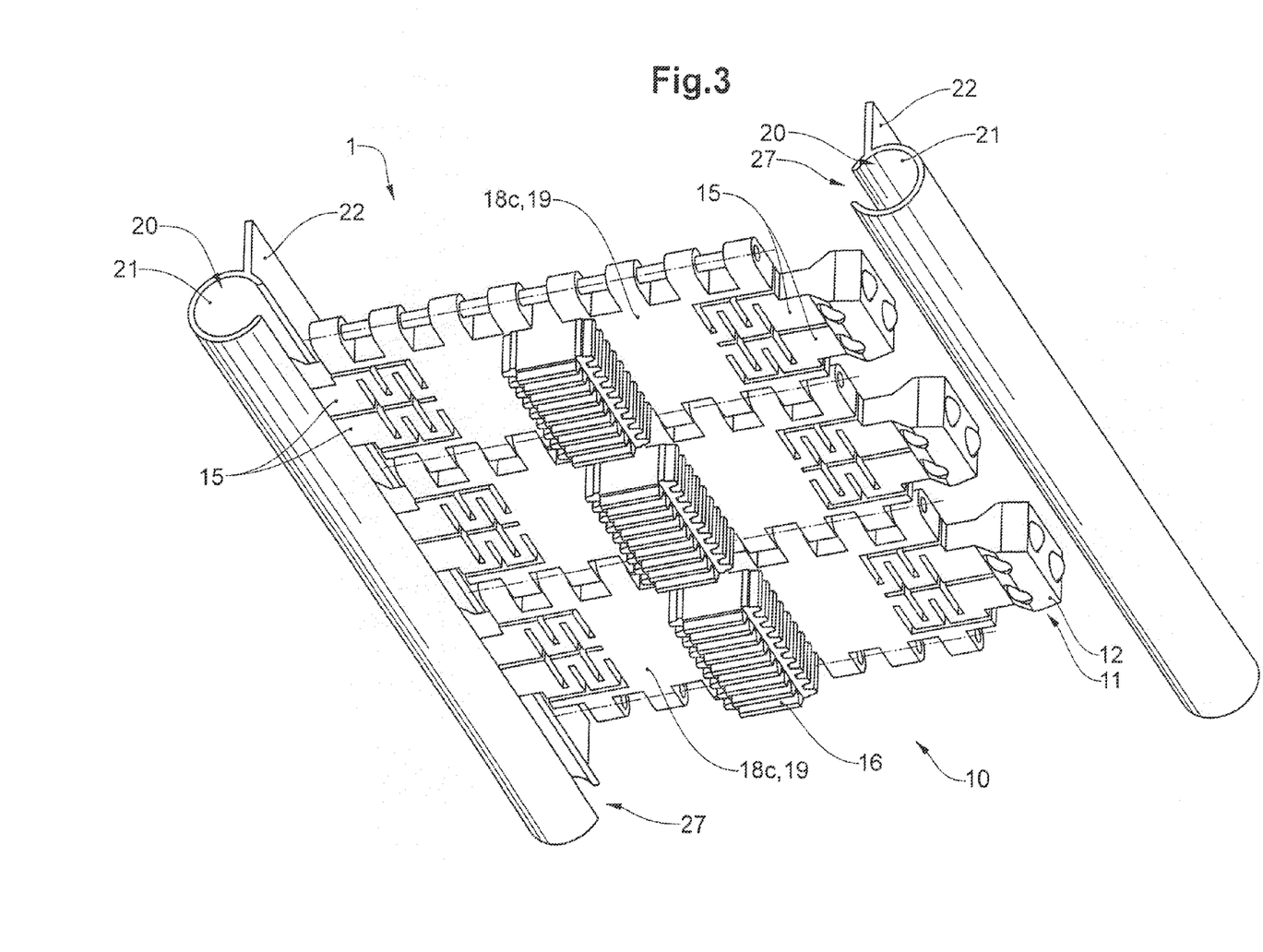

FIG. 3 shows a section of a conveying system 1 with both guide paths 20. The conveying elements 10 are designed as chain elements 18c and are connected to one another into a modular belt. The connection elements 19 comprise compensation elements 15. These permit a preferably elastic movement of the rolling bodies 11 with respect to the connection element 19 or at least with respect to the opposite rolling body 11 of the conveying element 10. This in turn permits a compensation of inaccuracies in the distance between the guide paths 10. In the present embodiment, the compensation elements 15 are thin and optionally meandering sections in a transition region between the connection elements 19 and rolling bodes 11 and which are formed as one piece on the conveying element 10. Preferably, these sections are designed such that the elasticity is the greatest in the direction of the distance between the guide paths 20, and in contrast the elasticity in the direction of load forces which act on the conveying elements 10 is as small as possible. For this, the compensation elements, if they consist of a homogeneous material, for example are larger in a cross section parallel to the load force direction, and due to this are stiffer than in a cross section perpendicular to the load force direction. Here too, as with FIG. 1, the complete conveying element 10 with the exception of the applied rolling elements 13, can be formed as one (single) piece, preferably of plastic.

Figure 4:
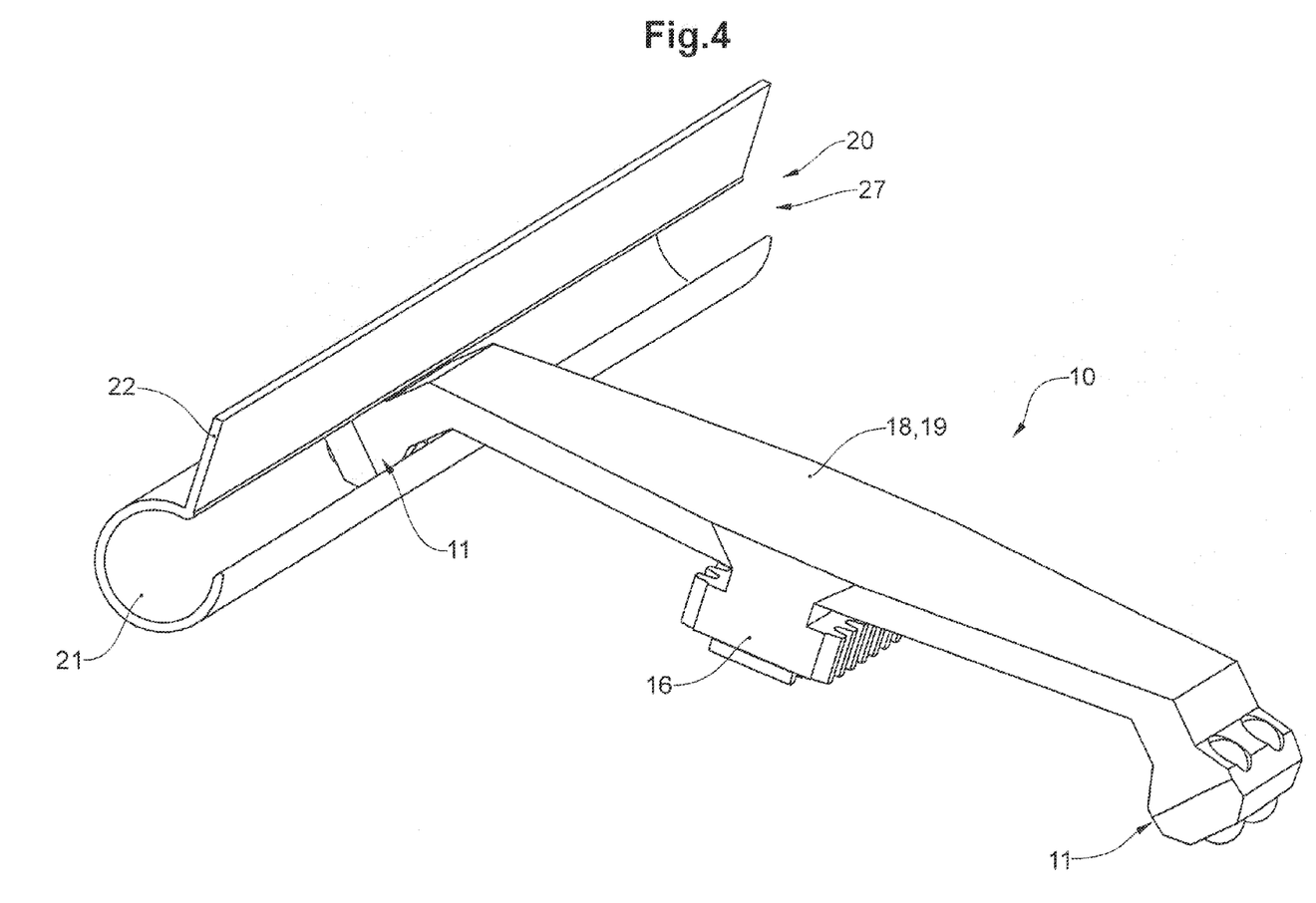

FIG. 4 shows a conveying element 10, with which the rolling bodies 11 are bent at an angle downwards with respect to the connection element 19. Accordingly, the slots 27 are directed upwards. The terms "upwards" and "downwards" are to be understood with regard to an assembled condition of the conveying system 1, with which objects lying on the conveying elements are conveyed, or objects hanging on the conveying elements are held with holding elements such as grippers. For a simpler cleaning, smaller slots can be arranged on the downward side of the guide channel 21, whereby however the stability of the guide channel 21 cannot be compromised.

Seen from its middle, the connection element 19 tapers towards the rolling body 11. This allows the guide paths 20 to be led around lateral curves. This for example is the case with the embodiments of FIGS. 5 to 9.

Figure 5:
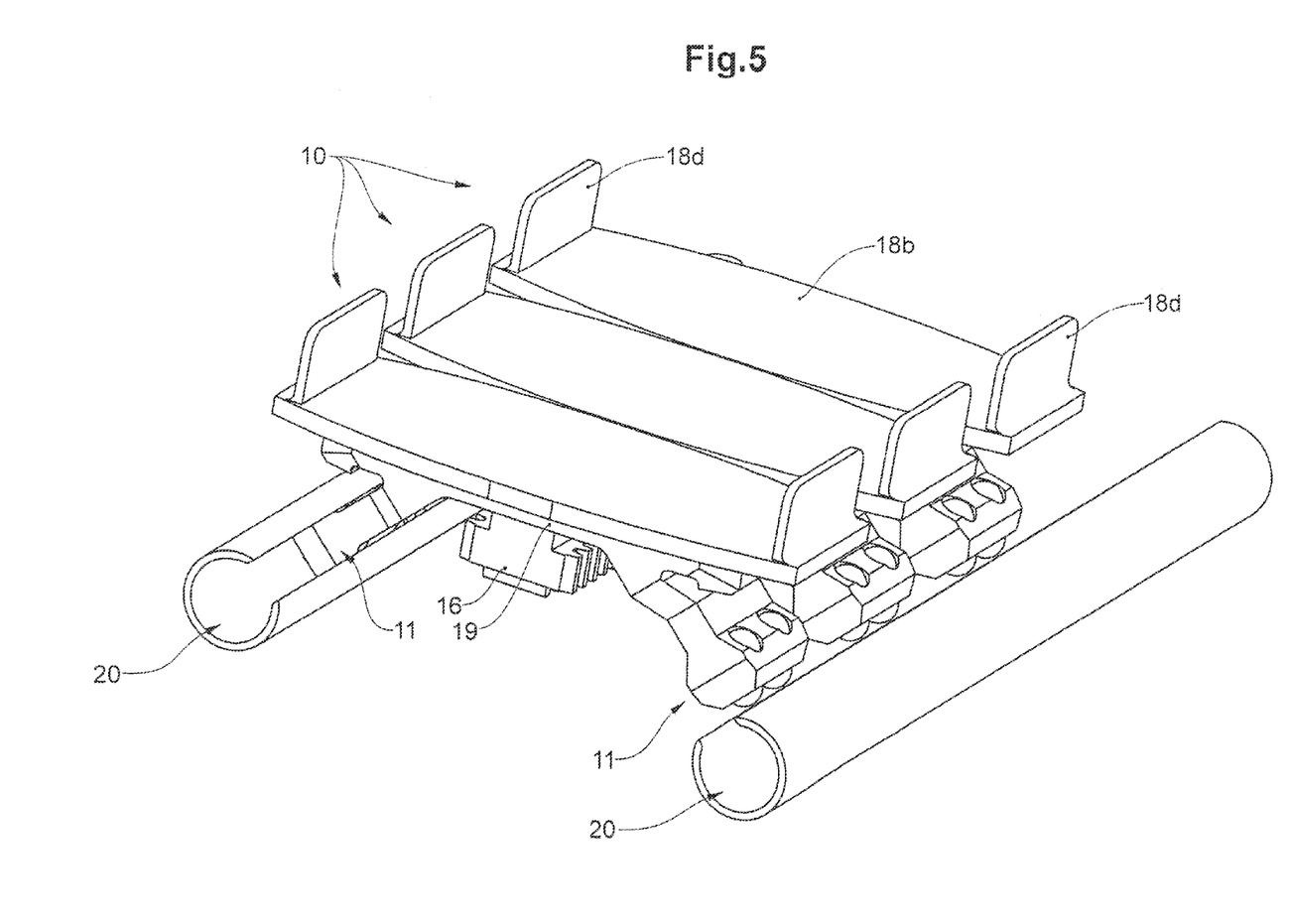

FIG. 5 shows conveying elements 10 which project laterally beyond the guide paths 20 (thus perpendicularly to the longitudinal direction of the guide paths 20 and thus of the conveying system 1). Plates 18b are applied or integrally formed on the connection elements 19 and extend in the lateral direction up to or beyond the region of the rolling bodies 11. The plates 18b at their lateral ends comprise integrally formed or attached co-moved supports 18d, instead of the absent lateral guide on the guide channels 21.

Figure 6:
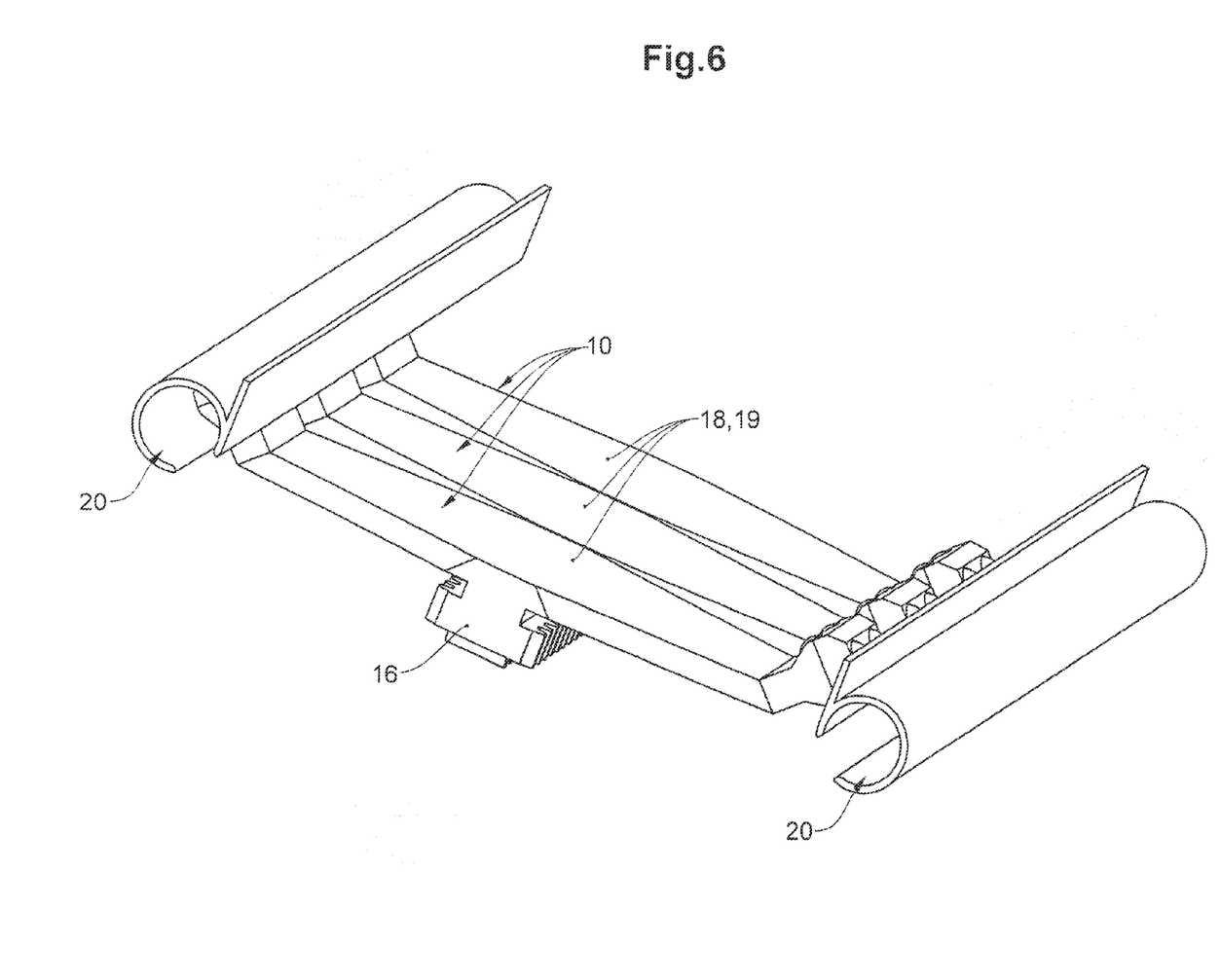

FIG. 6 shows conveying elements 10, with which the rolling bodies 11 are angularly bent upwards with respect to the connection element 19. Accordingly, the slots 27 are directed downwards. This embodiment of the invention is simple to clean, since dirt as well as cleaning fluid can fall down or flow down through the slots 27 which are open downwards.

Figure 7:
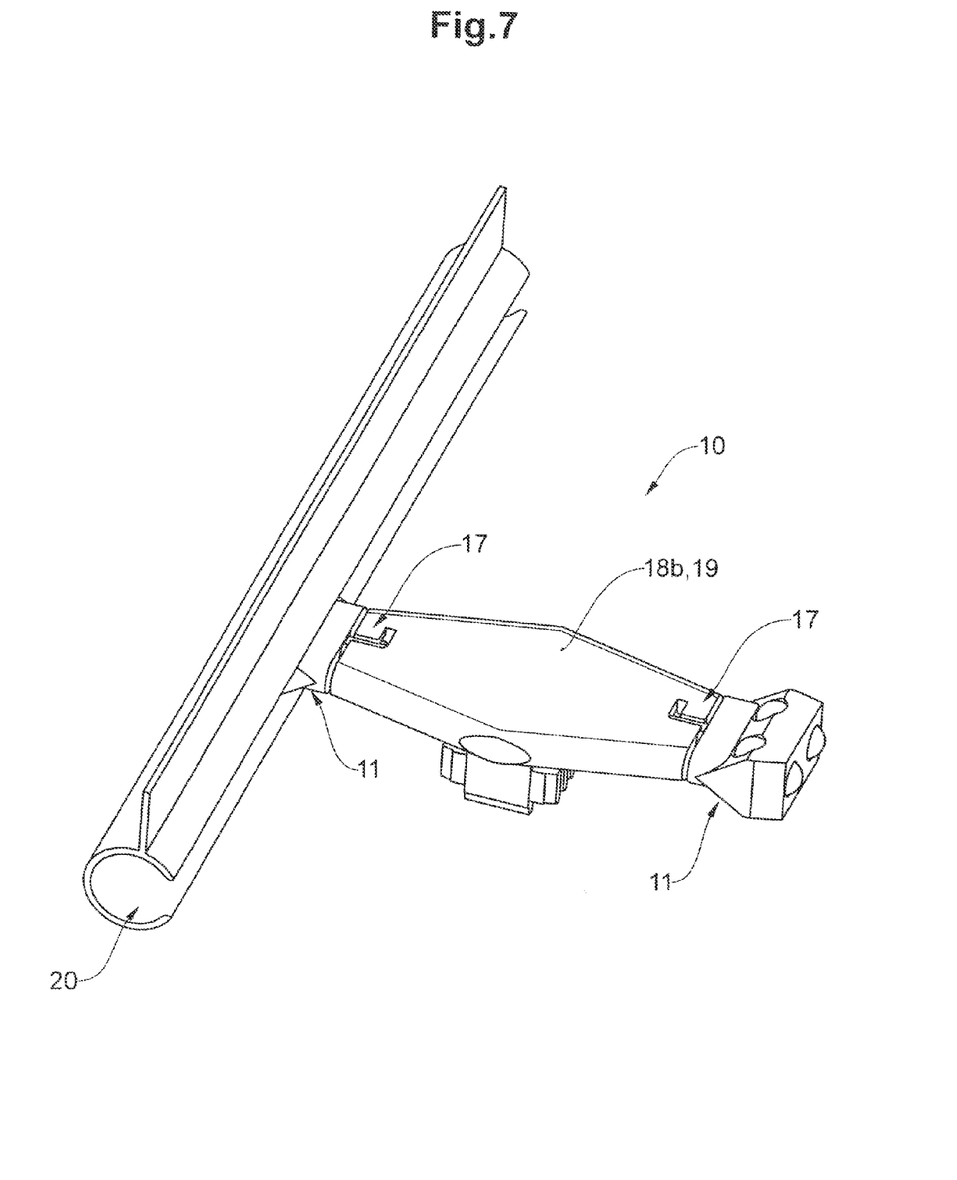
Figure 8A:
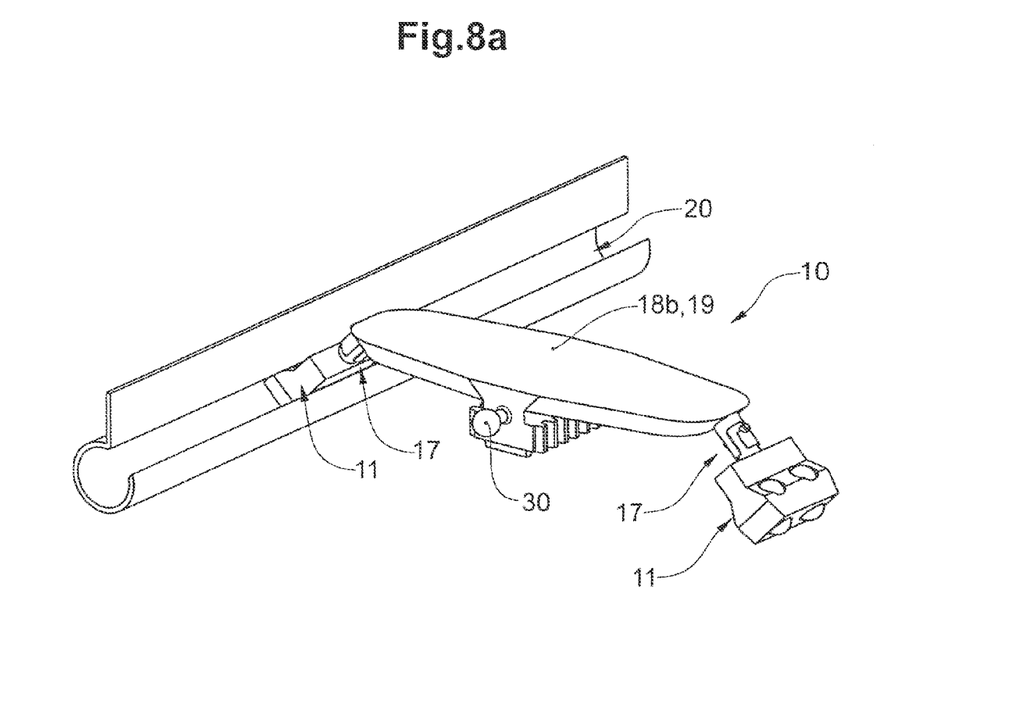
Figure 8B:
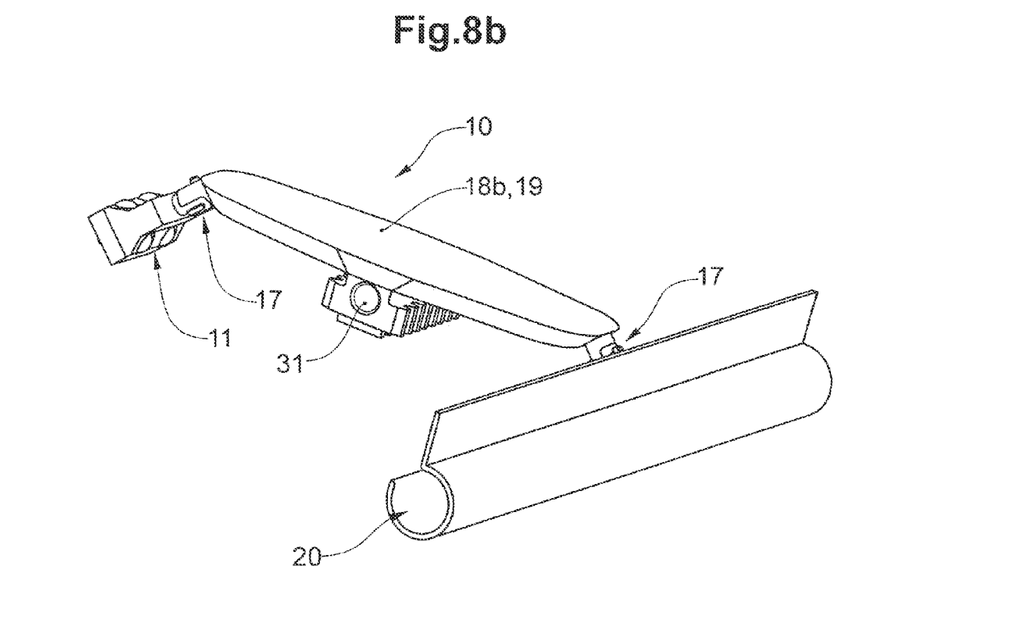
Figure 9:
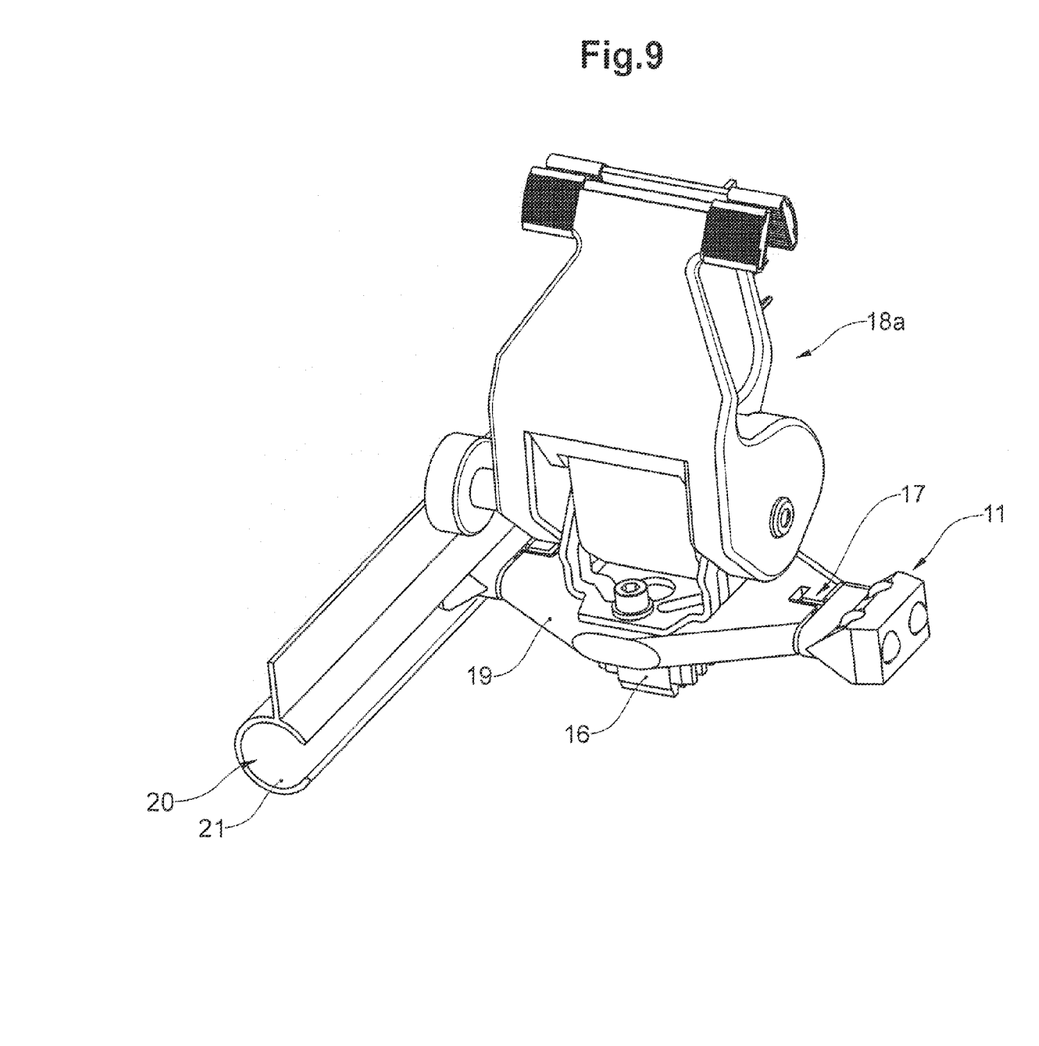

FIGS. 7-9 show conveying elements 10 with couplings 17 arranged between the connection element 19 and rolling bodies 11. With this, one can produce, and when required, combine different connection elements 19 and rolling bodies 11.

FIGS. 8a and 8b show two views of a conveying element 10 with a joint ball 30 on the one side (seen in the conveying direction) and with a corresponding ball joint socket 31 on the other side. With this, one can link several equally shaped conveying elements 10 to one another in an articulated manner.

FIG. 9 shows a holding element or gripper 18a as a transport element, which is applied on a connection element 19.

In the previously described embodiments, in each case two roller sets 14 per rolling element cage 12 are arranged behind one another. This provides a conveying element 10 with stability with regard to rotation about the connection line between its rolling bodies 11. If the conveying elements are coupled onto one another such that they cannot be rotated in such a manner, then only one roller set 14 per rolling body 11 can be arranged on each side of the conveying element 11. Vice versa, with greater loads and with a suitably limited curvature of the guide paths 20 in curves, one can also arrange more than two roller sets 14 per rolling body 11 behind one another in the movement direction.

Figure 10:
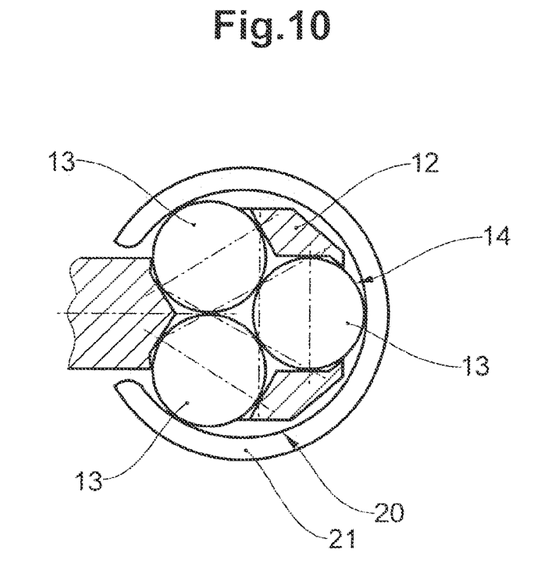
FIGS. 10-11 are sectional elevation views of the arrangement of rolling elements.

FIG. 10, in cross section through a rolling element cage 12, shows an individual roller set 14 with balls as rolling elements 13, which roll on one another. The rolling elements 13 roll on one another as well as on the inner side of the guide channel 21. Recesses in the rolling element cage 12 on their outer side are somewhat smaller that a diameter of the rolling elements 13, so that these snap into the recesses on insertion into the slightly elastic rolling element cage 12.

The design of the rolling bodies 11, the arrangement of the rolling elements 13 in the rolling body 11 as well as the rolling and introduction of load forces on the rolling elements 13 and the guide path 20 is already explained in the already cited WO 90/02269 which herewith is incorporated in its entirety by way of reference, in particular the explanations of the pages 10 to 16 and the associated figures.

Figure 11:
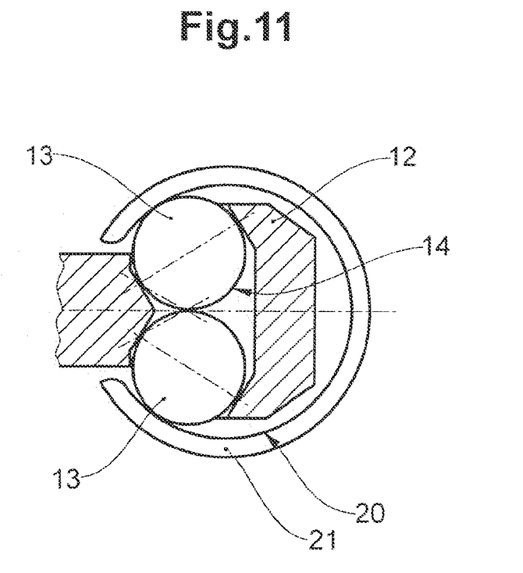

FIG. 11 shows a roller set 14 with two rolling elements 13, in cross section. All previously described embodiments can also be realised with such roller sets 14. However, the demands with regard to the accuracy of the parallel guidance are greater, and/or preferably compensation elements 15 are present, which permit an adequate compensation of inaccuracies and thereby in particular produce a pretensioning (tensile stress) between the rolling bodies 11 of a conveying element 10.

FIGS. 12-15 show details of conveying systems with roller inlays 23 for the rolling of the rolling elements 13 on the inner side of the guide channels 21. The roller inlays 23 are inlayed or formed or welded or bonded etc. on this inner side, and run in the longitudinal direction of the guide channel 21 at least in those regions along the periphery of the guide channel 21, in which the rolling elements 12 roll in the guide channel 21. The roller inlays 23 consist of a harder material than the guide channel 21, or of a material which with the rolling elements 13 forms a more favourable material pairing for the rolling. With this for example, the guide channels 21 can be manufactured of plastic and the roller inlays 23 of a hard plastic or of metal.

Basically, it is also possible to form a mounting similar to a roller inlay, by way of one or two wires in each case running parallel next to one another in the movement direction on each of the two or three roller inlays, so that each of the rollers rolls on such a wire or a pair of wires.

FIGS. 12-15 further show a fastening profile 24 which is integrally formed on a guide channel 21. The fastening profile 24 is thus formed as one piece with the guide channel 21 and optionally also a guide 22. The guide channel 21 can be assembled in a simple and flexible manner on a carrier 25 by way of a screw with slot nuts 26 for example.

Figure 12:
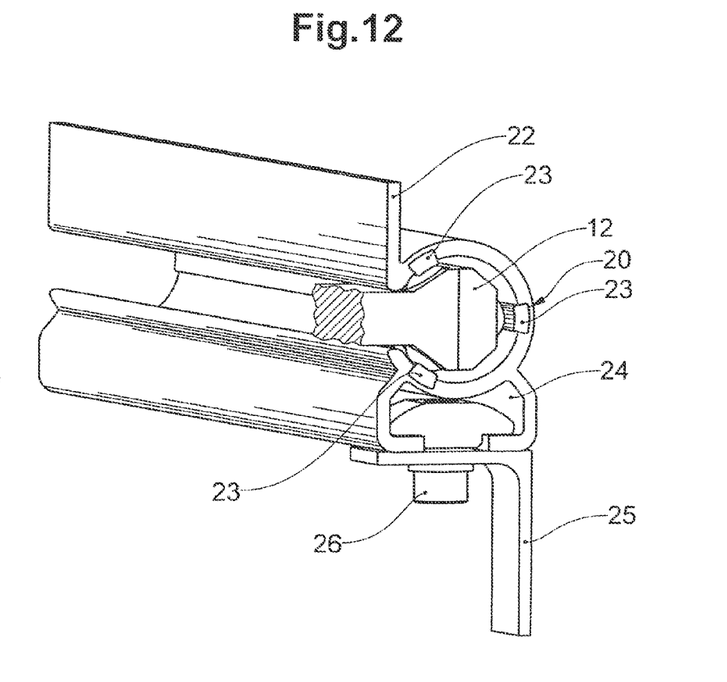
FIGS. 12-15 are perspective views of conveying systems with roller inlays for the rolling of the rolling elements.
Figure 14:
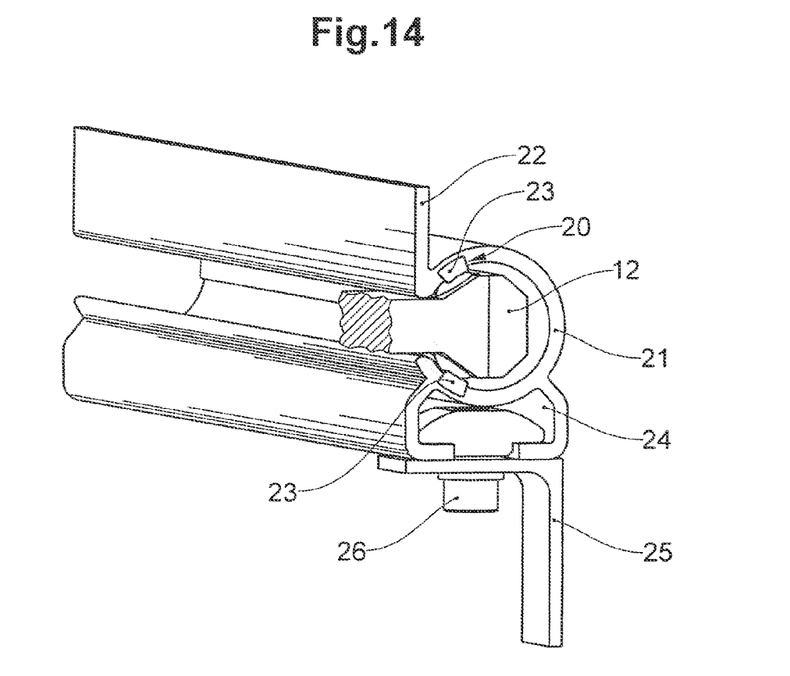

FIGS. 12 and 14 show rolling element cages 12 with roller inserts with three and two rolling elements respectively, and accordingly respectively three and two roller inlays 23 in the guide channel 21.

Figure 13:
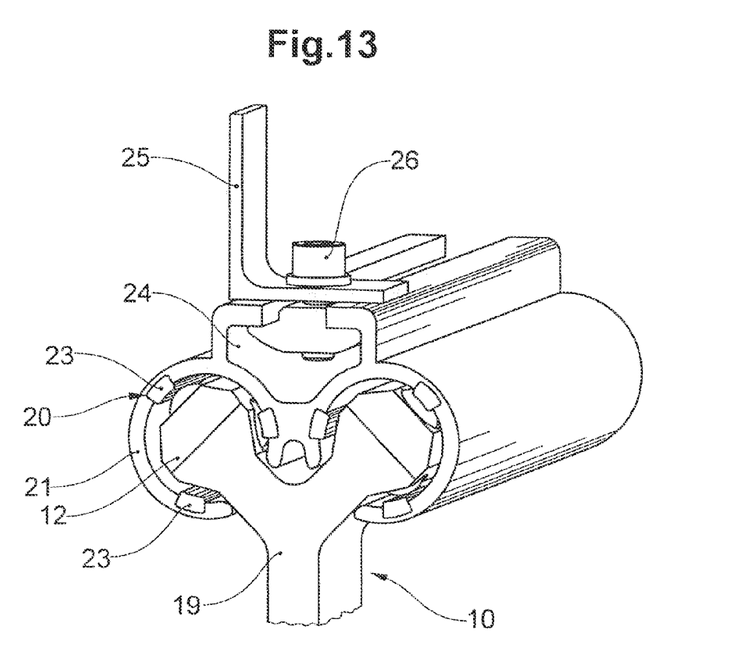
Figure 15:
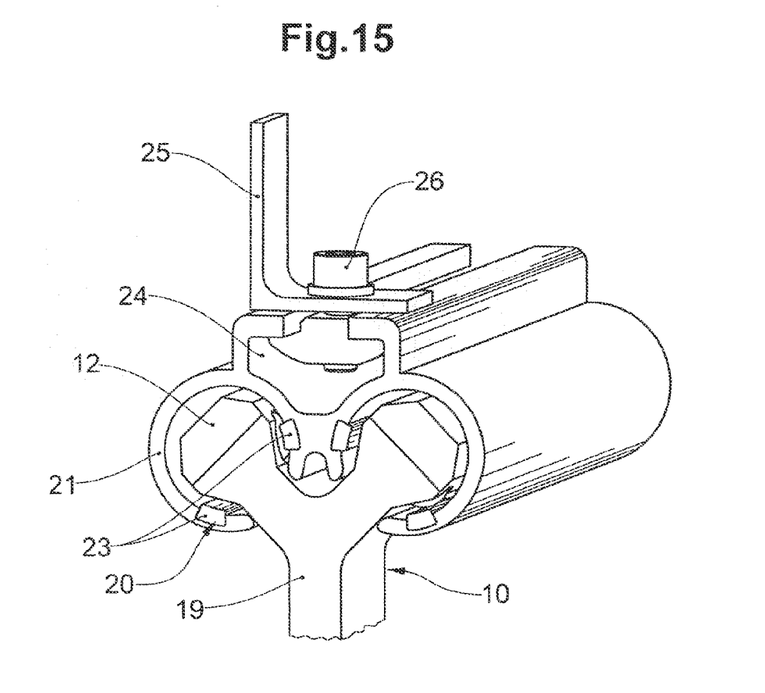

FIGS. 13 and 15 likewise show rolling element cages 12 with roller inserts with three and two rolling elements respectively, wherein the two rolling element cages 12 of one conveying element 10 are arranged close to one another, so that the respective two guide channels 21 are formed in the same profile. The two guide channels 21 are thus formed as one piece with one another and optionally also with a fastening profile 24.

The rolling bodies 11 are connected to one another by way of two branches of a Y-shaped connection element 19. Transport elements such as grippers, transport baskets or transport plates (not drawn) are arranged or can be fastened on the third branch of the "Y". The drawings show this third branch hanging down. In one variant with three rolling elements per roller insert according to FIG. 13, a reverse variant can also be realised with which the third branch points upwards.

The invention claimed is:
1. A conveying system, comprising:
rolling bodies, each with a rolling element cage and rolling elements, wherein the rolling elements are arranged in recesses of the rolling element cage and for rolling in a guide channel, and wherein two or more of the rolling elements form a roller set, and each of the rolling elements of the roller set simultaneously rolls on other rolling elements of the roller set as well as on the guide channel, and at least one of the roller sets is present per rolling body;

at least two guide channels run at an essentially constant distance to one another and together form a guide path; and at least two rolling bodies are connected to one other into a conveying element by way of a connection element, and the conveying element with its at least two rolling bodies is movable in at least two guide channels along the guide path.

2. A conveying system according to claim 1, wherein each of the rolling elements contacts the guide channel at only one point and rolls along a single line on the guide channel.

3. A conveying system according to claim 1, wherein an inner wall of the guide channels, on which the rolling bodies roll, follows a section of a circle.

4. A conveying system according to claim 1, wherein the guide channels are profile rods.

5. A conveying system according to claim 1, wherein a guide which is lateral with respect to a conveying surface moved by the conveying elements, is formed as one piece on the guide channels as part of the profile.

6. A conveying system according to claim 1, wherein a fastening profile for fastening the guide channels is formed as one piece on the guide channels as part of the profile.

7. A conveying system according to claim 1, wherein the guide channels are manufactured of plastic and, in regions, on which the rolling elements roll, include roller inlays of metal.

8. A conveying system according to claim 1, wherein slots of the guide channels, through which the rolling bodies are connected to the connection element, are open downwards in the operationally ready condition of the conveying system.

9. A conveying system according to claim 1, wherein the conveying elements have a planar conveying surface, on which conveyed products are conveyed, or the conveying elements include holding means for the hanging conveying of conveyed products.

10. A conveying system according to claim 1, wherein the conveying element in the connection element includes at least one compensation element for compensating variations in the distance between the guide channels.

11. A conveying system according to claim 1, wherein the conveying elements include a drive force introduction for the drive of the conveying elements.

12. A conveying system according to claim 11, further comprising:
a drive which acts on the drive force introduction from two directions which are opposite to one another, so that forces of the drive onto the conveying elements which act perpendicularly to the movement direction, compensate one another, and forces of the drive which act parallel to the movement direction, add up.

13. A conveying system according to claim 1, wherein the conveying element includes a coupling for the releasable connection to a transport element and/or for a snap connection to a transport element.

14. A conveying system according to claim 1,
wherein all or individual groups of the conveying elements are linked to one another and are movable, in the conveying direction, or
wherein the conveying elements are individually displaceable in the guide path in the conveying direction.

15. A conveying system according to claim 1, wherein the rolling element cage moves in the guide channel in a conveying direction, and center points of the rolling elements of a roller set lie on a circle in a plane that extends perpendicularly to the conveying direction.

16. A conveying element for use in a conveying system, said conveying system including rolling bodies and at least two guide channels, each of the rolling bodies including a rolling element cage and rolling elements, wherein the rolling elements are arranged in recesses of the rolling element cage and for rolling in one of the guide channels, and wherein two or more of the rolling elements form a roller set, and each of the rolling elements of the roller set simultaneously rolls on other rolling elements of the roller set as well as on the guide channel, and at least one of the roller sets is present per rolling body;
said at least two guide channels run at an essentially constant distance to one another and together form a guide path;
and wherein said conveying element comprises at least two rolling bodies that are connected to one by way of a connection element, and the at least two rolling bodies forming the conveying element are movable in the at least two guide channels along the guide path.

* * * * *